Nov. 20, 1945.　　　　F. E. KELLER　　　　2,389,197
RIVET SET FORMING TOOL
Filed May 6, 1943　　　　2 Sheets-Sheet 1
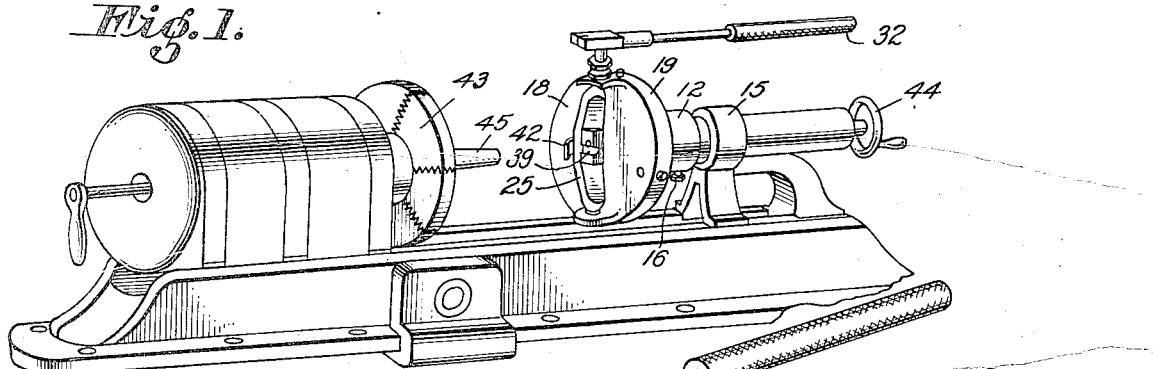
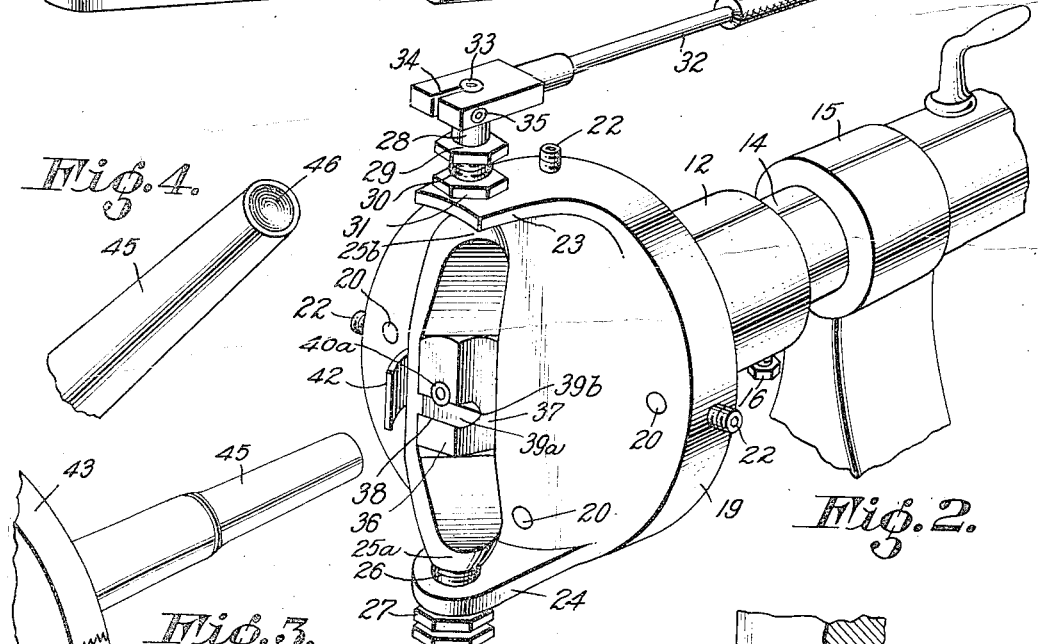
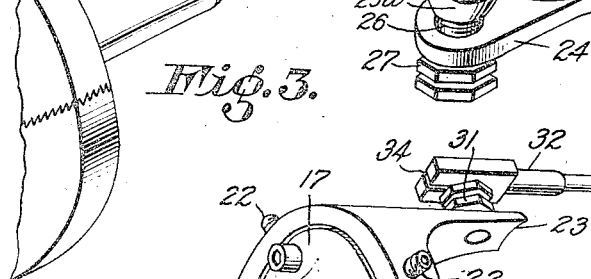
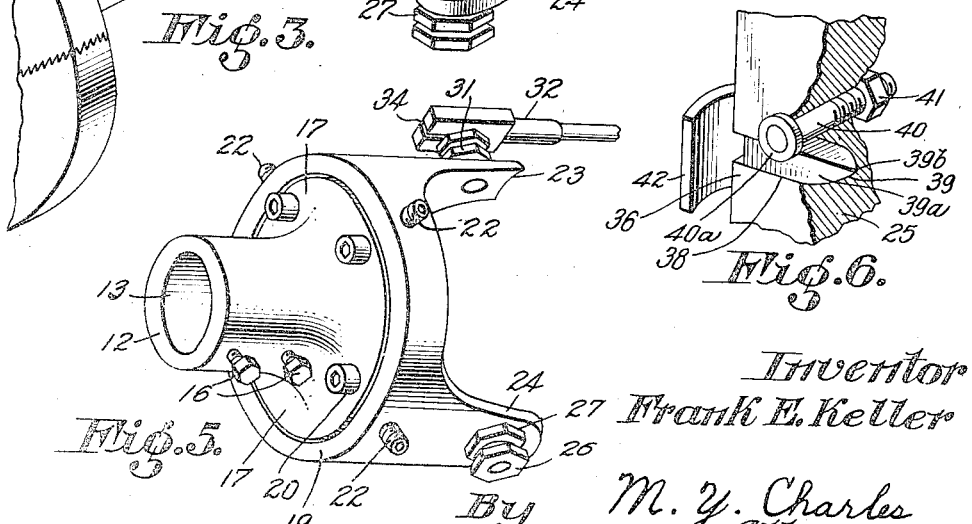
Inventor
Frank E. Keller
By M. Y. Charles
Attorney Nov. 20, 1945. F. E. KELLER 2,389,197
RIVET SET FORMING TOOL
Filed May 6, 1943 2 Sheets-Sheet 2
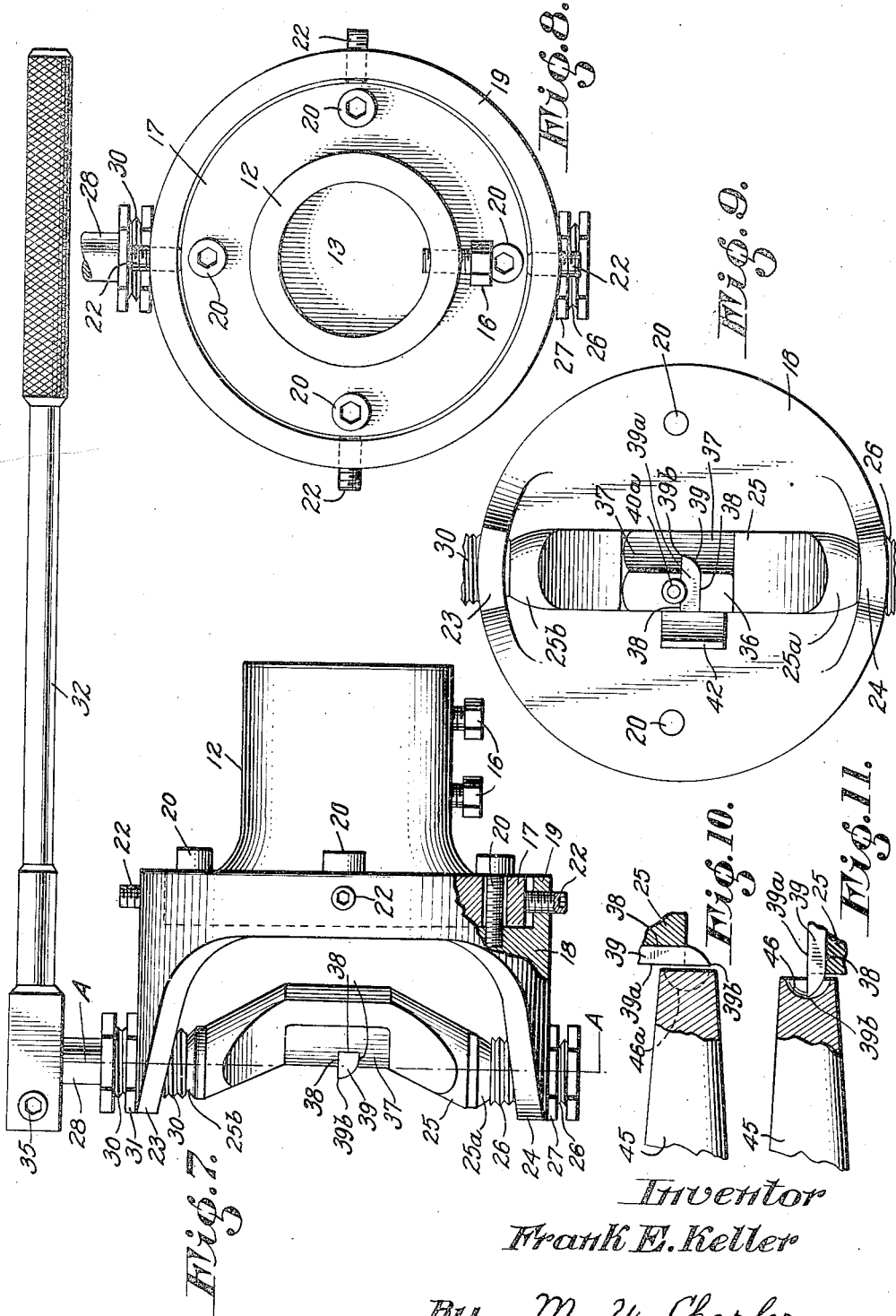
Inventor
Frank E. Keller
By M. Y. Charles
Attorney Patented Nov. 20, 1945

2,389,197

UNITED STATES PATENT OFFICE 2,389,197

RIVET SET FORMING TOOL

Frank E. Keller, Wichita, Kans.

Application May 6, 1943, Serial No. 485,848

2 Claims. (Cl. 77—1)

My invention relates to a rivet set forming tool. The purpose of this tool is to cut quickly and accurately the hollow in the end of a rivet set to conform to the contour of the rivet head to be driven.

A further object of the invention is to provide a tool of the kind mentioned that may be affixed to any standard lathe whereby the work (rivet set shaft), may be turned against the cutting tool to form the hollow end of the rivet set.

A further object is to provide a tool of the kind mentioned that is accurate in its work, one that is substantial and durable, a tool that is moderate in cost as well as being simple in construction and simple and easy to use. These and other objects will be more fully explained as this description progresses.

Now referring to the accompanying drawings—

Fig. 1 is a perspective view of a lathe and showing my improved rivet set forming tool mounted on the tail stock spindle of the lathe.

Fig. 2 is an enlarged detail perspective view of my rivet set forming tool positioned ready to make the forming cut on the rivet set stock.

Fig. 3 is an enlarged perspective view of the rivet set stock mounted in the lathe chuck and in position, in relation to Fig. 2, to be cut by the tool.

Fig. 4 is a perspective view of the end of the rivet set after the cut has been made in the end thereof.

Fig. 5 is a perspective detail view of the back and side of rivet set forming device.

Fig. 6 is an enlarged perspective and sectional view of the cutting tool and the tool holder portion of the device.

Fig. 7 is a detail side view of the rivet set forming tool, parts of which are broken away and shown in section for convenience of illustration.

Fig. 8 is a rear view of the device as shown in Fig. 7.

Fig. 9 is a face or front view of the rivet set forming tool as shown in Fig. 7.

Fig. 10 is a side view of the rivet set, the end of which is shown in section and the cutting tool is shown in position to be rocked to make the cut that is to be made as indicated by the dotted line.

Fig. 11 is a side view of the rivet set, the end of which is shown in section and the cutting tool is in position arrived at after the cut in the end of the rivet set has been made.

Similar numerals of reference designate the same parts throughout the several figures of the drawings.

In the drawings is shown my improved rivet set forming tool as having a shank 12 that has a bore 13 longitudinally positioned therein for the reception of the tail stock spindle 14 of the tail stock 15 of the lathe. The shank 12 is provided with set screws 16 that are threaded through the wall of the shank 12 and extend into the bore 13 so that when the shank 12 is placed on the tail stock spindle 14 it may be rigidly set and held thereon by the tightening of the set screws 16. On one end of the shank 12 is integrally formed a face plate 17.

Against and around the face plate 17 is positioned a cup like element having a plate 18 and a flange 19 that is integrally formed on the plate 18. The plate 18 is solidly held against the face plate 17 by means of bolts 20 that pass loosely through holes 21 in the face plate 17 and are threaded into the plate 18. Through the flange 19 and spaced ninety degrees apart are threaded four screws 22 the inner ends of which bear against the edge of the face plate 17 so that by tightening and loosening the diametrically positioned screws 22 the cup shaped element 18—19 may be slightly shifted on and in parallelism with the face plate 17 for centering purposes as will later be explained.

Integrally formed on the element 18—19 is a pair of support elements 23 and 24 that are in alignment and are concentric with the flange 19.

Between the supports 23 and 24 is a yoke tool carrying element 25, the lower end of which is cone shaped as at 25a and is revolvably seated in a cone shaped bearing in the end of a screw 26 that is threaded through the support 24, there being a lock nut 27 threaded on the screw 26 and adapted to engage the outer face of the support 24 upon the turning of the nut 27 on the screw 26 so as to definitely lock the screw 26 in its adjusted position. The upper end of the yoke 25 is provided with a conical portion, the apex end of which terminates with a round shaft 28 that is integrally formed thereon and revolvably passes through a bore 29 that is axially positioned in a screw 30 and the lower end of which is cone shaped to form a bearing in which the cone portion 25b of the yoke 25 is revolvably seated. The screw 30 being threaded through the support 23 and there being a lock nut 31 threaded on the screw 30 and adapted to engage the face of the support 23 to lock the screw 30 in its adjusted position as will be readily understood.

The device is provided with a handle 32, one end of which is provided with a hole 33 and a cut 34 extending from the inner end of the handle 32 to the hole 33, there being a clamp screw 35 passing through the ends on either side of the cut 34 and being threaded into one of said ends so that the upper end of the shaft 28 may be positioned in the hole 33 and the screw 35 tightened to rigidly tighten and hold the handle 32 on the shaft 28 so that the yoke 25 may be revolved by the swinging of the handle 32.

The yoke 25 is a curved element and the central portion has two flat faces 36 and 37 set at an angle of ninety degrees to each other and the line of intersection of these two faces 36 and 37 lies on the axis A—A of the bearing supporting the yoke 25 regardless of any position to which the yoke 25 may be swung about the axis A—A.

The side 36 of the yoke 25 is provided with a horizontally positioned tool seat 38 in which a cutting tool 39 is positioned so that the outer face 39a of the tool 39 is substantially flush with the face 36 of the yoke 25.

The yoke 25 is provided with a bolt 40 that passes through the yoke 25 in such a manner that the head 40a of the bolt 40 overlaps the edge portion of the face 39a of the tool 39. The other end of the screw 40 projects beyond the rear face of the yoke 25 and is threaded to receive a nut 41 that is threaded thereon and functions when the nut 41 is turned, to draw the screw 40 rearwardly so that the head 40a thereof rigidly binds the tool 39 in its adjusted position in the tool seat 38.

At 42 is shown a curved piece of metal that is rigidly attached to the yoke 25 and is bent in the form of an arc of a circle whose center lies on the axis A—A of the yoke bearings, the object of which will later be explained.

In Fig. 1 is shown a lathe having a chuck 43 for holding the work to be worked on and having my improved rivet set forming tool mounted on the center shaft 14 of the tail stock 15 of the lathe, the center shaft 14 being movable toward and away from the chuck 43 by the turning of the hand wheel 44 in the usual manner.

The operation of the device is as follows. The stock 45 from which the rivet set is to be made is placed in the chuck 43 and centered therein in the usual manner. Now the cut that is to be made in the end of the stock 45 is a concave hemispherical or a smaller part of a sphere in shape as shown at 46, therefore the outer point 39b of the tool 39 must be set the distance of the radius of the cut to be made from the axis line A—A. The tool 39 may be accurately set by setting a micrometer to span from the outside of the curved piece 42 to the face 37 which would be on the axis line A—A. This having been done the micrometer is opened up enough more to exactly include the radius of the cut that is to be made. Now the tool 39 may be slidably positioned in the tool seat 38 and one contact point of the micrometer placed against the outside of the curved piece of metal 42 and then the tool slipped to a projected position until the point of the tool engages the other contact of the micrometer, whereupon the nut 41 may be turned on the bolt 40 and the head 40a of the bolt 40 will engage and rigidly bind and hold the tool 39 in its properly adjusted position preparatory for making the desired cut.

This having been done the lathe is started and the chuck 43 and stock 45 therein is revolving. Now the tail stock 15 is moved so that the tool 39 is adjacent the end of the stock 45 and thereby swinging the handle 32 the tool 39 will be rocked so that the mechanic operating the device can tell definitely whether or not the tool 39 is exactly in the position he wants it to make the cut he intends to make. If the tool is not in the desired position the tool may be slightly shifted sideways or up or down by loosening and tightening the diametrically positioned screws 22. The tool 39 having been thus properly positioned is now ready to make the cut indicated by the dotted line 46a. The adjusting wheel 44 of the lathe may now be turned so as to space the tool a short distance from the end of the stock 45 and in the position shown in Fig. 10, the handle 32 may now be swung to turn the tool 39 to the position shown in Fig. 11, whereupon the cut has been partially made. Now the handle is swung to return the tool to the position shown in Fig. 10 and by turning the adjusting wheel 44, the tool is moved a little closer to the stock 45 and the handle 32 is again swung so the tool 39 moves again to the position shown in Fig. 11, whereupon an additional cut has been taken, and this process is continued until the face 36 of the yoke 25 engages the end of the stock 45 whereupon the handle 32 may again be swung to move the tool 39 to the position shown in Fig. 11 and the final cut has been made and the form 46 for the rivet set is completed.

The machine having once been set up as above described numerous stocks 45 may be successively placed in the chuck 43 and the rivet sets may be quickly and accurately turned out in large numbers.

Such modifications of my invention may be employed as lie within the scope of the appended claims without departing from the spirit and intention of my invention. Now having fully shown and described my invention, what I claim is:

1. In a rivet set forming tool; a face plate and a hollow shank thereon for the snug reception of the tail stock spindle of a lathe, a flanged plate having bearing support legs thereon, a tool carrying yoke, said tool carrying yoke being revolvably carried in bearings on said bearing support legs and handle means connected to said tool carrying yoke element for swinging the yoke about an axis passing through the yoke bearings, and means for holding the second said plate against the first said face plate to maintain parallelism of the second said plate and the first said face plate, and means for shifting the second said plate in a plane parallel to the first said face plate, and means for rigidly holding the second said plate in adjusted positions against the first said face plate for the purpose described.

2. In a rivet set forming tool as defined in claim 1; the second said plate having a rearwardly extending flange thereon whose inside diameter is greater than the outside diameter of the first said face plate, said means for holding the second said plate against the first said face plate being a plurality of screws each of which pass through a loose fitting hole in the first said face plate and threaded into the second said plate, said means for shifting the second said plate being a plurality of screws threaded through the said flange of the second said plate and spaced therearound, the inside ends of said screws in the flange engaging the edge of the first said face plate to effect the shifting of the second said plate against the first said face plate upon the turning of the screws as shown and described.

FRANK E. KELLER.